(No Model.) 2 Sheets—Sheet 1.
S. HARRISON & J. T. SHEARD.
APPARATUS FOR TESTING GAS PIPES AND FITTINGS.
No. 441,659. Patented Dec. 2, 1890.
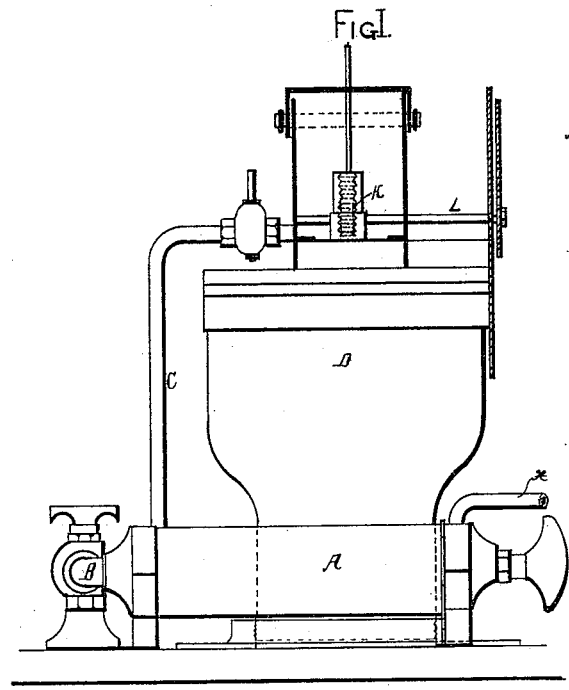
Fig. I.
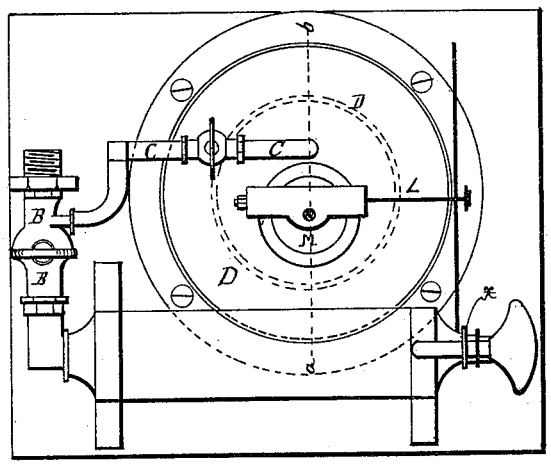
Fig. II.
WITNESSES:
INVENTORS
Samuel Harrison
John T. Sheard
BY
James N. Lancaster
ATTORNEY (No Model.) 2 Sheets—Sheet 2.
S. HARRISON & J. T. SHEARD.
APPARATUS FOR TESTING GAS PIPES AND FITTINGS.
No. 441,659. Patented Dec. 2, 1890.
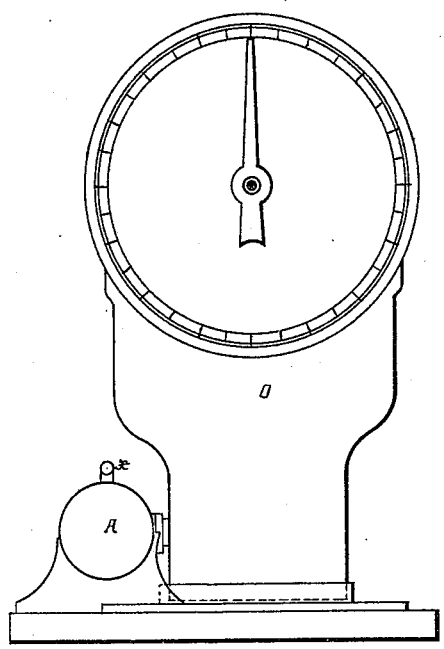
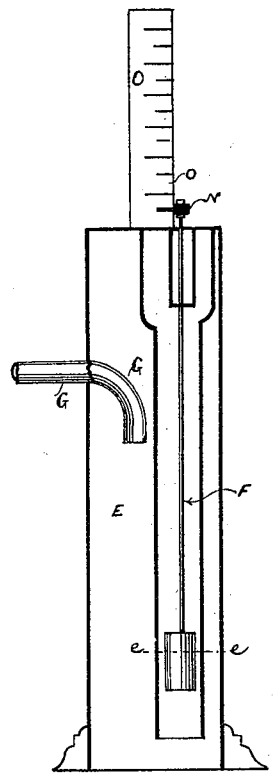
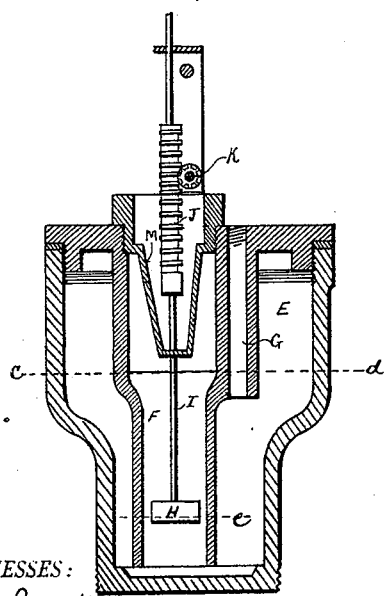
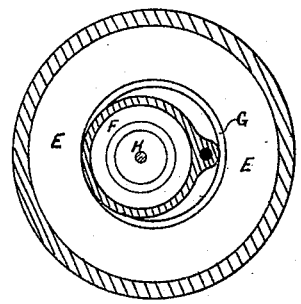
WITNESSES:
Franklin Barrett.
Edw'd C. Burgess.
INVENTORS:
Samuel Harrison
John T. Sheard
BY James H. Lancaster
ATTORNEY.

UNITED STATES PATENT OFFICE.

SAMUEL HARRISON AND JOHN T. SHEARD, OF SALFORD, ENGLAND.

APPARATUS FOR TESTING GAS PIPES AND FITTINGS.

SPECIFICATION forming part of Letters Patent No. 441,659, dated December 2, 1890.

Application filed October 7, 1889. Serial No. 326,292. (No model.) Patented in England September 23, 1887, No. 12,893.

*To all whom it may concern:*

Be it known that we, SAMUEL HARRISON and JOHN TOMLINSON SHEARD, of 9 Slater Street, Pendleton, and 6 Howard Street, Eccles New Road, respectively, both in the borough of Salford, England, have invented certain Improved Apparatus for Testing Gas Pipes and Fittings, (for which we have obtained a patent in Great Britain, No. 12,893, bearing date September 23, 1887;) and we do hereby declare the following to be a full, clear, and exact description of the invention, such as will enable others skilled in the art to which it pertains to make and use it, reference being had to the accompanying drawings, which form part of this specification.

Our invention relates to the testing of gas pipes and fittings by means of the gas or air contained in them; and it consists in improved apparatus for ascertaining and exhibiting the amount of pressure or exhaust existing in such gas pipes and fittings and for producing in them any desired amount of pressure or exhaust for the purpose of ascertaining whether they are tight or whether leakages occur and of facilitating the dicovery of such leakages.

The apparatus consists of an air-pump and a pressure-gage in which the pressure of the gas or air, acting upon a column of liquid, raises or lowers a float, and thereby moves, through the medium of suitable connecting-gear, a pointer in front of a scale or dial.

Pressure-gages in which a column of liquid moves a float have been before constructed, water being the liquid employed, and our improvement upon such gages consists in employing a non-volatile liquid, (for example, mercury or glycerine,) whereby the attention and frequent adjustment hitherto necessitated by the evaporation of the water is obviated, while in the case of mercury the higher specific gravity of the liquid enables the same pressure to be shown with a shorter column of liquid, thus reducing the bulk and increasing the portability of the apparatus, and also in so arranging the inlet-pipe and the part of the gage where the liquid is exposed to the atmosphere that the gage may be placed or carried in any position without the liquid being lost out of it. The air-pump is employed to force into or to exhaust from the pipes or fittings being tested a quantity of air or gas, and the pressure-gage to show the amount of pressure or exhaust thus produced or otherwise existing in them, a leakage in the pipes or fittings being shown by the pressure or exhaust produced in them decreasing, while when they are sound it remains constant. The locality of the leakages, when they occur, can be discovered by testing separate lengths of pipe or sealing the fittings in succession.

Reference is to be had to the accompanying drawings, forming part of this specification, in which similar letters indicate corresponding parts in all the figures.

Figure 1 is a side elevation, Fig. 2 a plan, and Fig. 3 a front elevation, of an air-pump, in combination with a pressure-gage wherein mercury is the liquid employed, constructed as hereinafter described. Fig. 4 is a sectional elevation on line *a b*, and Fig. 5 a sectional plan on line *c d*, of the mercurial pressure-gage. Fig. 6 is a sectional elevation of a pressure-gage in which glycerine is the liquid employed, constructed as hereinafter described.

The air-pump may be of any ordinary suitable construction. Such a pump is shown at A, and consists of a cylinder fitted with a piston attached to one end of a rod which passes through a stuffing-box at the front part or nearer end of the cylinder, and has at its extremity a handle for working it. The piston is provided with a valve, and within the cylinder at its back part or farther end another similar valve is fitted, valves opening away from the handle being employed when air or gas is to be forced into the pipes or fittings and valves opening toward the handle when the air or gas is to be exhausted from them. In a convenient position at the front part or nearer end of the cylinder a small pipe *x* is inserted, to which may be attached a tube connected with a gas-supply when gas is to be pumped into the pipes or fittings being tested, and by which air enters when it is employed, or by which the air or gas is expelled when the pipes are being exhausted. To the back part or farther end of the pump a pipe B, with a cock in it, is attached, this pipe being connected to another pipe C, communicating with the pressure-gage D, and which may likewise have a cock between the connection with the pipe B and the gage. One of said pipes is arranged to be screwed upon or otherwise connected to the pipes to be tested.

We do not limit ourselves to the precise arrangement of the air-pump and pressure-gage shown in the drawings, as the pump may, for instance, be placed vertically instead of horizontally or in any other position and at such distance from or proximity to the gage as may be found desirable, provided always that the connections between the two and with the pipes to be tested are maintained in the manner we have indicated.

The mercurial pressure-gage consists of a hollow casing E, of iron, glass, or other suitable material unaffected by mercury, to the top side of which we attach or fix a cylinder F, open at the bottom and descending to a short distance from the bottom of the casing. The latter is filled with mercury, as shown at e, to above the open bottom end of the cylinder, when the gage is placed upright. We conduct the air or gas supply into the interior of the casing by means of an inlet port or pipe G, which enters into the interior of the casing, and may be on either the top, bottom, or side of the interior of the casing, (in Fig. 4 it is shown to be on the top,) and which extends to such a distance within the interior of the casing that its open end is above the level of the mercury in whatever position the gage may be held. The diameters of the cylinder and of the casing, respectively, are so proportioned that the surface area of mercury exposed in the former bears a definite and known ratio to that in the latter. In Fig. 4 it is shown as one to three. Into the cylinder we place a float H, swimming on the mercury, and attach to it a rod I, passing through the top of the casing, and having a rack J on it outside, which gears with a small spur-wheel or pinion K on a shaft L, carrying a pointer in front of a dial-plate. Instead of the rack and pinion, a rod and friction-wheel or a counterbalanced cord or chain passing over a grooved pulley or any other suitable mechanism may be employed; but we prefer a rack and pinion as being more certain in its operation and less liable to get out of order. We make the top of the casing where the float-rod passes through it in the form of an inverted truncated cone M, (or instead thereof it may take the form of a straight pipe, as shown in Fig. 6,) projecting into the interior of the cylinder, so that when the gage is turned upside down no mercury is lost out of the opening. The toothed gearing of the rack and pinion we adjust so that the movement of the float in the cylinder is made to show on the dial the total amount of pressure to which the mercury in the gage is subjected. When the area of mercury within and that without the cylinder are in the proportion stated—that, namely, of one to three—the float will move three-quarters of an inch for every inch pressure or exhaust on the gage. Therefore, if, for example, the rack has twelve teeth to the inch, a pinion having nine teeth on its periphery will make one complete revolution with a pressure or exhaust on the gage equal to one inch of mercury.

To employ glycerine or other non-volatile liquid which is not of very much higher specific gravity than water, we require, in order to admit of an equal range of pressure being shown by the pressure-gage, a much taller column of liquid than when mercury is employed. In a pressure-gage suitable for such liquid, as shown in Fig. 6, we make the casing E with its cylinder F deeper than in the mercurial pressure-gage to an extent corresponding to the difference in specific gravity. The casing may be made of tin-plate, sheet-brass, or other material with soldered or brazed joints, and may be much lighter and thinner than is required when mercury is employed. G is the inlet-pipe, which may be placed at either the top or bottom instead of at the side, as shown. The level of the liquid is shown at e. The float may be connected to the pointer by similar gearing to that specified for a mercurial pressure-gage, except that the rack-rod, cord, or chain must be longer and the pinion-wheel or pulley of greater diameter because of the longer travel of the float with the lighter liquid for the same amount of pressure or exhaust on the gage. Instead of employing such gearing and a circular dial, we prefer to attach the pointer to the end of the float-rod, as represented at N, causing it to move with a vertical motion only in front of a vertical scale O.

The method of using the apparatus is as follows: Supposing the service-pipe and fittings of a house are to be tested, the apparatus is fixed upon or put into communication with any part of the piping and the communication of the latter with the main cut off by the stop-cock. Air or gas is then pumped into the piping by means of the air-pump, having valves opening away from the handle, until the pressure in the piping is equal to, say, about twelve inches of water-pressure or nearly an inch of mercury. This pressure is transmitted through the pipe communicating with the pressure-gage to the air contained in the casing and depresses the level of the liquid to which it is exposed, at the same time causing that within the cylinder to be elevated, which raises the float attached to the pointer when a vertical scale is employed and to the rack when a circular dial is employed, and the rack, actuating the pinion with which it gears, causes the pointer to move in front of the dial to a distance corresponding with the exact amount of pressure to which the liquid in the pressure-gage is subjected. After the desired pressure has been obtained the cock leading to the air-pump is closed and the apparatus allowed to stand. If the service-pipe and fittings are tight, the pressure in the pipes and gage will be maintained and the pointer remain at rest, while if leakage occurs the pressure will decrease and the pointer indicate this decrease. By taking separate lengths of pipe or sealing the fittings in succession the locality of the leakage can be discovered.

Instead of pumping air or gas into the piping, the air or gas contained in it may be exhausted by means of a pump having valves opening toward the handle, the operation being conducted in other respects in a similar manner to that described. An exhaust or minus pressure in the piping will be indicated on the scale or dial by the pointer moving in the reverse direction to that caused by pressure, because in that case the level of the liquid within the cylinder is depressed while that without the cylinder is elevated.

The pressure-gage shown in Fig. 6 is intended only to indicate pressure and not exhaust.

Having now fully described our invention, what we claim as new, and desire to secure by Letters Patent, is—

1. The mercurial pressure-gage consisting of the hollow casing, the cylinder F, depending within said casing and having an integral pipe G extending into the casing with its lower end above the level of the mercury, the float H, having its rod passed upward through the cylinder F and having a rack, the pinion K, meshing with the rack, and an index, all substantially as shown and described.

2. The mercurial pressure-gage consisting of the hollow casing, the cylinder F, depending within the casing and having an integral pipe G extending into the casing with its lower end above the level of the mercury, the inverted truncated cone M within the cylinder F, the float H, having its rod passed upward through the said inverted cone and provided with a rack, a pinion carried by a horizontal shaft and meshing with the rack, and an index, all arranged and operating substantially as shown and described.

In testimony that we claim the foregoing we have hereunto set our hands this 29th day of August, 1889.

SAMUEL HARRISON.
JOHN T. SHEARD.

Witnesses:
ALBERT E. BRETHERTON,
WILLIAM T. DAYNES.